United States Patent Office 3,527,752
Patented Sept. 8, 1970

3,527,752
17β - DIALKYLAMINOALKYLAMINO - 5α - ANDRO-STANO[3,2-c] - 1' - PHENYLPYRAZOLES AND DERIVATIVES THEREOF
Paul D. Klimstra, Northbrook, Ill., assignor to G. D. Searle & Co., Chicago, Ill., a corporation of Delaware
No Drawing. Filed Mar. 3, 1969, Ser. No. 803,943
Int. Cl. C07c 173/00
U.S. Cl. 260—239.5
6 Claims

ABSTRACT OF THE DISCLOSURE

The condensation of a 17-keto-5α-androstano[3,2-c]-1'-phenylpyrazole with a dialkylaminoalkylamine affords the corresponding 17-imines, which are reduced to yield the instant 17β-dialkylaminoalkylamino-5α-androstano-[3,2-c]-1'-phenylpyrazoles and derivatives thereof. The latter diamines display valuable pharmacological properties, i.e. anti-inflammatory and anti-microbial.

The present invention is concerned with novel steroidal chemical compounds characterized by an androstano[3.2-c] ring structure, and more particularly, with 17β-dialkylaminoalkylamino - 5α - androstano[3,2-c]-1'-phenylpyrazoles and derivatives thereof represented by the following structural formula

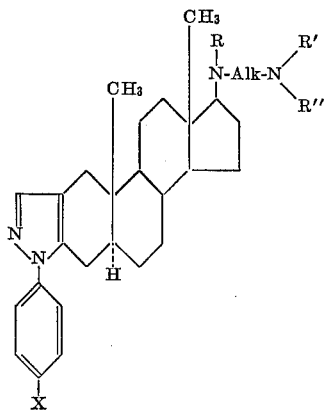

wherein Alk represents a lower alkylene radical, R is hydrogen or a lower alkanoyl radical, R and R' are lower alkyl radicals and X is hydrogen or a fluorine atom.

The lower alkyl radicals denoted in the foregoing structural representation are typified by methyl, ethyl, propyl, butyl, pentyl, hexyl, heptyl and the branched-chain groups isomeric therewith.

Typical of the lower alkylene radicals denoted in that structural formula are ethylene, trimethylene, tetramethylene, pentametheylene and the corresponding branched-chain isomeric groups.

17β-hydroxy-2-hydroxymethylen-α-androstan - 3 - one serves as a convenient starting material for the manufacture of the compounds of this invention. Condensation with an optionally substituted phenylhydrazine affords the corresponding androstano[3,2-c]-1'-phenylpyrazole. The process is exemplified by the reaction of that starting material with 4-fluorophenylhydrazine, thus affording 17β-hydroxy-5α-androstano[3,2-c]-1'-(4-fluorophenyl)pyrazole. Oxidation of those 17-hydroxy intermediates affords the corresponding 17-keto compounds. The reaction of the aforementioned 17β-hydroxy-5α-androstano[3,2-c]-1'-(4-fluorophenyl)pyrazole with aluminum isopropoxide and cyclohexanone in toluene affords 17 - oxo - 5α - androstano[3,2-c] - 1' - (4 - fluorophenyl)pyrazole. Those 17 - oxo compounds are heated with a dialkylaminoalkylamine to afford the instant intermediate imines. A mixture of 17-oxo-5α-androstano[3,2-c]-1'-(4-fluorophenyl)pyrazole with 3 - diethylaminopropylamine and a catalytic quantity of p-toluenesulfonic acid in benzene is heated at the reflux temperature to yield 17-[N-(3-diethylaminopropyl)-imino]-5α - androstano[3,2-c] - 1'-(4-fluorophenyl)pyrazole. Reduction of those imines with a metallic hydride affords the instant diamines. The latter 17-[N-(3-diethylaminopropyl)-imino]-5α - androstano[3,2-c] - 1' - (4' - fluorophenyl)pyrazole is thus contacted at room temperature with sodium borohydride in methanol to yield 17β-(3-diethylaminopropyl) amino - 5α-androstano[3,2-c]-1'-(4'-fluorophenyl)pyrazole.

The instant N-(lower alkanoyl) compounds are conveniently manufactured by acylation of the instant diamines with a lower alkanoic acid anhydride. 17β-(3-diethylaminopropyl)amino - 5α - androstano[3,2-c]-1'-(4-fluorophenyl) pyrazole is contacted with formic anhydride—prepared in situ from formic acid and acetic anhydride—to afford 17β-[N-formyl-(3 - diethylaminopropyl)]amino-5α androstano[3,2-c]-1'-(4-fluorophenyl) pyrazole.

The compounds of this invention exhibit valuable pharmacological properties. They are, for example, anti-inflammatory agents in view of their capacity to inhibit the edematous swelling associated with inflammatory states. In addition, they are anti-microbial agents as is evidenced by their anti-fungal properties, in particular against *Trichophyton mentagrophytes* and *Ceratocystis ulmi*, and their anti-algal activity, specifically against *Chlorella vulgaris*.

The anti-inflammatory property of the compounds of this invention is specifically illustrated by the activity of 17β-(3-diethylaminopropyl)amino-5α-androstano[3,2-c]-1'-(4 - fluorophenyl)pyrazole and 17β-[N-formyl-(3-diethylaminopropyl)]amino - 5α - androstano[3,2-c]-1'-(4-fluorophenyl)pyrazole when tested in the following assay:

Each of a group of 10 intact male rats weighing 100–130 g. is injected under the plantar surface of each hind foot with 0.1 ml. of a 1% solution of carrageenin (Type 402, Marine Colloids, Inc.). The test compound, dissolved or suspended in saline, corn oil or propylene glycol, is administered subcutaneously or intragastrically 1 hour prior to the carrageenin injection. The doses normally employed at 25 mg. per rat subcutaneously or 5 mg. per rat intragastrically. Another such group serving as controls is treated in the identical manner save for omission of the test compound. The edema resulting from carrageenin injection is determined by measuring the circumference of the hind feet, in arbitrary units, 5 hours after the carrageenin injection and subtracting the average swelling of the group treated with the test compound from the average swelling of the control group. Compounds are rated active if they produce a significant decrease ($P \leq 0.05$) in the swelling observed in control animals.

The activity of 17β - (3-diethylaminopropyl)amino-5α-androstano[3,2-c]-1'-(4 - fluorophenyl)pyrazole, 17β-[N-formyl-(3-diethylaminopropyl)]amino - 5α - androstano [3,2-c]-1'-(4 - fluorophenyl)pyrazole and 17β-[N-acetyl-(3-diethylaminopropyl)]amino - 5α - androstano-[3,2-c]-1'-(4-fluorophenyl)pyrazole in the following assay illustrates the anti-fungal activity of the instant compounds:

The test compound is dissolved or suspended in melted Sabouraud agar and is held at 80° C. for 20 minutes. Dilutions are made from this preparation in melted Sabouraud agar in order to yield concentrations of the test substance of 1000, 100, 10 and 1 mcg./ml. in the agar. The agar is permitted to cool and solidify and is then surface inoculated with a suspension of spores of *Trichophyton mentagrophytes* or *Ceratocystis ulmi*. The inoculated media are incubated at room temperature for 6–7 days and are examined grossly for the presence or absence of growth of the test organism. Control preparations lacking the test compound are employed for comparative purposes. The activity of the compound is recorded as mcg. of the compound/ml. of agar which completely prevents visible growth of the test organism.

The activity of 17β-(3 - diethylaminopropyl)amino-5α-androstano[3,2-c]-1'-(4 - fluorophenyl)pyrazole, 17β-[N-formyl-(3-diethylaminopropyl)]amino - 5α - androstano [3,2-c]-1'-(4 - fluorophenyl)pyrazole and 17β-[N-acetyl-(3 - diethylaminopropyl)]amino-5α-androstano[3,2-c]-1'-(4-fluorophenyl)pyrazole in the following assay illustrates the anti-algal property of the instant compounds:

Sterile Bristol agar is inoculated with an aqueous suspension of the alga, *Chlorella vulgaris*, whereupon 5 mg. of the test compound is placed on the inoculated agar surface. The inoculated agar is incubated at room temperature under artificial light for 7 days, at the end of which time it is examined for mircobial growth. Activity is indicated by a clear zone of inhibition of growth surrounding the test compound.

The invention will appear more fully from the examples which follow. These examples are set forth by way of illustration only and it will be understood that the invention is not to be construed as limited thereby either in spirit or in scope as many modifications both in materials and methods will be apparent from this disclosure to those skilled in the art. In these examples, temperatures are given in degrees centigrade (° C.). Quantities of materials are expressed in parts by weight unless otherwise noted.

EXAMPLE 1

A mixture containing 15 parts of 17β-hydroxy-2-hydroxymethylen-5α-androstan-3-one, 7.8 parts of 4-fluorophenylhydrazine hydrochloride and 400 parts of ethanol is heated at the reflux temperature for about 2½ hours, then is allowed to stand for about 16 hours. Removal of the solvent by distillation under reduced pressure affords an oily residue, which partially solidifies upon standing. That material is extracted with methylene chloride and the organic layer is separated, washed successively with dilute aqueous sodium hydroxide and water, dried over anhydrous sodium sulfate containing decolorizing carbon and stripped of solvent under reduced pressure to afford a dark-colored residue. The latter material is purified by chromatography on silica gel followed by elution with 10% ethyl acetate in benzene, thus affording 17β-hydroxy-5α-androstano[3,2-c]-1'-(4-fluorophenyl)pyrazole.

EXAMPLE 2

A solution containing 15 parts of 17β-hydroxy-5α-androstano[3,2-c]-1'-(4 - fluorophenyl)pyrazole, 71.3 parts of cyclohexanone and 260 parts of toluene is slowly distilled over a period of about 1 hour in order to remove moisture. At the end of that time a solution of 30 parts of aluminum isopropoxide in 260 parts of toluene is slowly added over a period of about 1 hour. The reaction mixture is heated at the reflux temperature for 2½ hours, then is cooled and diluted with approximately 450 parts by volume of saturated aqueous sodium potassium tartrate. The solvents are removed by steam distillation and the aqueous residue is filtered. The resulting solid product is dried, thus affording 17-oxo-5α-androstano[3,2-c]-1'-(4-fluorophenyl)pyrazole, characterized by an ultraviolet absorption maximum at about 250 millimicrons with a molecular extinction coefficient of about 8,800.

EXAMPLE 3

A mixture consisting of 11 parts of 17-oxo-5α-androstano[3,2-c] - 1' - (4-fluorophenyl)pyrazole, 7 parts of 3-diethylaminopropylamine, 0.9 part of p-toluenesulfonic acid monohydrate and 176 parts of benzene is heated at the reflux temperature for about 72 hours, during which time the water of reaction is removed azeotropically. Following that reaction period the solvents are removed by distillation under reduced pressure, thus affording, as an oil, 17-[N-(3-diethylaminopropyl)imino] - 5α - androstano[3,2-c]-1'-(4-fluorophenyl)pyrazole.

EXAMPLE 4

When an equivalent quantity of 2-dimethylaminoethylamine is substituted in the procedure of Example 3, there is obtained 17-[N-(2-dimethylaminoethyl)imino]-5α-androstano[3,2-c]-1'-(4-fluorophenyl)pyrazole.

EXAMPLE 5

To a solution of 15 parts of 17-[N-(3-diethylaminopropyl)imino] - 5α - androstano[3,2-c]-1'-(4-fluorophenyl)pyrazole in 160 parts of methanol is added cautiously, over a period of about 45 minutes, 8 parts of sodium borohydride. After completion of the addition the mixture is stirred for about 30 minutes, then is carefully poured into water. The resulting gummy residue is extracted into ether and the ether extract is washed with water, dried over anhydrous sodium sulfate containing decolorizing carbon and stripped of solvent by distillation under reduced pressure, thus affording, as an oil, 17β-(3-diethylaminopropyl)amino - 5α - androstano[3,2-c]-1'-(4-fluorophenyl)pyrazole. This compound is represented by the following structural formula

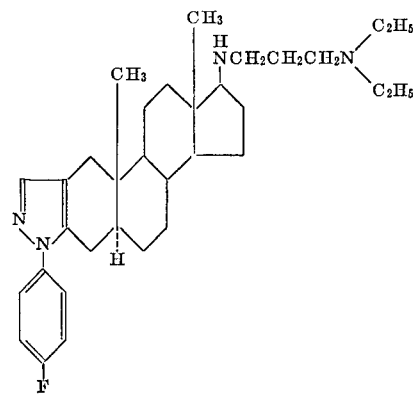

To a solution of 2 parts of the latter diamine in 50 parts of ethyl acetate is added a solution of 1.2 parts of oxalic acid in 50 parts of ethyl acetate. The resulting precipitate is collected by filtration, washed on the filter with ethyl acetate and dried in air to afford 17β-(3-diethylaminopropyl)amino - 5α - androstano[3,2-c]-1'-(4-fluorophenyl)pyrazole-dioxalate.

EXAMPLE 6

When an equivalent quantity of 17-[N-(2-dimethylaminopropyl)amino-5α-androstano[3,2-c]-1' - (4 - fluorophenyl)pyrazole is substituted in the procedure of Example 5, there is produced 17β-(2-dimethylaminoethyl)amino-5α-androstano[3,2-c]-1'-(4-fluorophenyl)pyrazole.

EXAMPLE 7

A mixture of 5 parts of 17β-(3-diethylaminopropyl) amino-5α-androstano[3,2-c] - 1' - (4-fluorophenyl)pyrazole and 35 parts of acetic anhydride is warmed for a few minutes, then is allowed to stand at room temperature for about 4½ hours. At the end of that time the mixture is diluted with water and methanol, then is neutralized carefully by the addition of dilute aqueous sodium hydroxide. That mixture is then extracted with ether and the ether extract is washed with water, dried over anhydrous sodium sulfate and stripped of solvent under reduced pressure. Purification of the resulting crude product from ethyl acetate affords 17β-[N-acetyl-(3-diethylaminopropyl)]amino - 5α - androstano[3,2-c]-1'-(4-fluorophenyl)pyrazole, melting at about 193–195° and characterized by an optical rotation of +27.5°. This compound is represented by the following structural formula

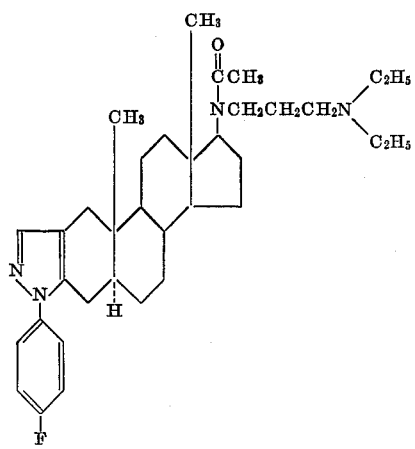

EXAMPLE 8

When equivalent quantities of 17β-(2-dimethylaminoethyl)amino - 5α - androstano[3,2-c]-1'-(4-fluorophenyl)pyrazole and propionic anhydride are allowed to react according to the procedure of Example 7, there is obtained 17β-[N-propionyl-(2-dimethylaminoethyl)]amino-5α-androstano[3,2-c]-1'-(4-fluorophenyl)pyrazole.

EXAMPLE 9

A mixture of 36.6 parts of formic acid and 30 parts of acetic anhydride is prepared and allowed to cool to room temperature, then is added to 3 parts of 17β-(3-diethylaminopropyl)amino - 5α - androstano[3,2-c]-1'-(4-fluorophenyl)pyrazole. The resulting reaction mixture is heated on a steam bath for about 2 hours, at the end of which time it is diluted with methanol, then made alkaline by the addition of dilute aqueous sodium hydroxide. Cooling of the resulting alkaline mixture to 0–5° results in the separation of pale yellow needle-like crystals, which are collected by filtration, washed on the filter with water and dried in air to produce 17β-[N-formyl-(3-diethylaminopropyl)]amino - 5α - androstano[3,2-c]-1'-(4-fluorophenyl)pyrazole. This compound exhibits an optical rotation of +49° and is characterized further by the following structural formula

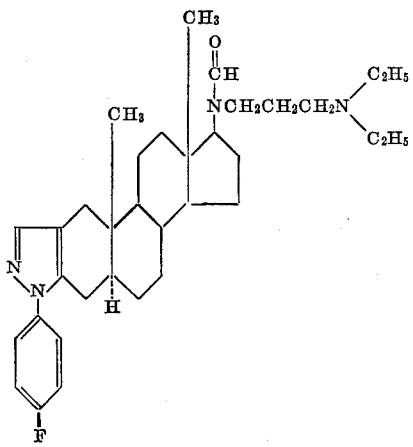

What is claimed is:
1. A compound of the formula

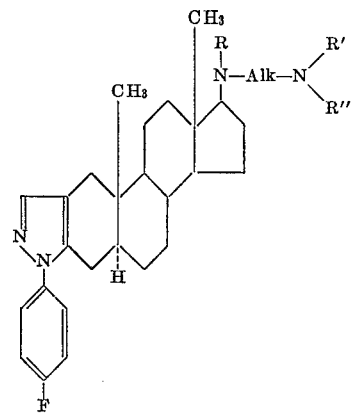

wherein Alk denotes a lower alkylene radical, R is a member of the class consisting of hydrogen and a lower alkanoyl radical and R' and R" represent lower alkyl radicals.

2. As in claim 1, a compound of the formula

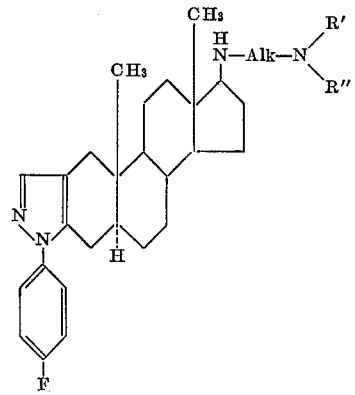

wherein Alk denotes a lower alkylene radical and R' and R" represent lower alkyl radicals.

3. As in claim 1, a compound of the formula

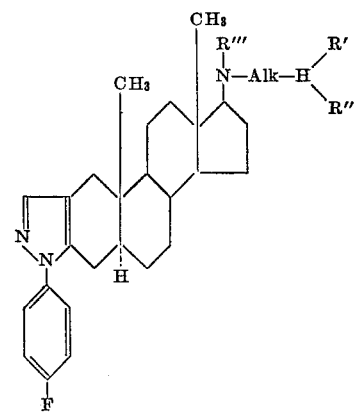

wherein Alk is a lower alkylene radical, R' and R" represent lower alkyl radicals and R''' is a lower alkanoyl radical.

4. As in claim 1, the compound which is 17β-(3-diethylaminopropyl)amino - 5α - androstano[3,2-c]-1'-(4-fluorophenyl)pyrazole.

5. As in claim 1, the compound which is 17β-[N-formyl-(3-diethylaminopropyl)]amino - 5α - androstano [3,2-c]-1'-4-fluorophenyl)pyrazole.

6. As in claim 1, the compound which is 17β-[N-acetyl-(3-diethylaminopropyl)]amino - 5α - androstano-[3,2-c]-1'-(4-fluorophenyl)pyrazole.

References Cited
UNITED STATES PATENTS 3,094,521  6/1963  Patchett _____ 260—239.5

LEWIS GOTTS, Primary Examiner

E. G. LOVE, Assistant Examiner

U.S. Cl. X.R.

71—67, 92; 424—241

PO-1050
(5/69)

UNITED STATES PATENT OFFICE
CERTIFICATE OF CORRECTION

Patent No. 3,527,752         Dated September 8, 1970

Inventor(s)   Paul D. Klimstra

It is certified that error appears in the above-identified patent and that said Letters Patent are hereby corrected as shown below:

Column 1, line 23, "[3.2-" should be -- [3,2- --.

Column 1, line 57, "hydroxymethylen-α-androstan" should be -- hydroxymethylen-5α-androstan --.

Column 2, line 22, "5α androstano" should be -- 5α-androstano --.

Column 4, line 59, "pyrazole-dioxalate" should be -- pyrazole dioxalate --.

Column 6, third formula,

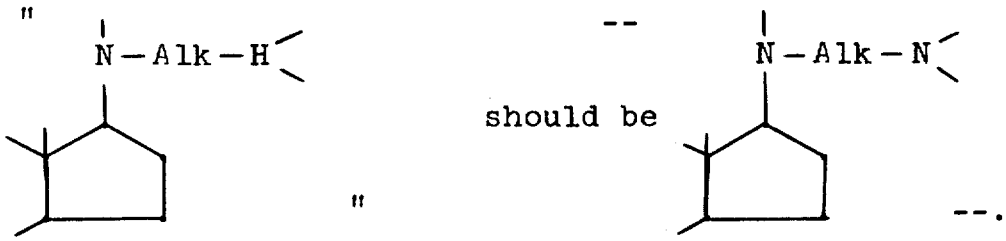

Column 7, line 9, "1'-4-fluorophenyl)" should be -- 1'-(4-fluorophenyl) --.

Signed and sealed this 1st day of December 1970.

(SEAL)
Attest:

Edward M. Fletcher, Jr.
Attesting Officer

WILLIAM E. SCHUYLER, JR.
Commissioner of Patents